(12) United States Patent
Choi et al.

(10) Patent No.: US 6,868,305 B2
(45) Date of Patent: Mar. 15, 2005

(54) INTELLIGENT HYDRAULIC MANIFOLD USED IN AN INJECTION MOLDING MACHINE

(75) Inventors: Christopher Choi, Richmond Hill (CA); Ian Crookston, Toronto (CA)

(73) Assignee: Husky Injection Molding Systems Ltd. (CA)

( * ) Notice: Subject to any disclaimer, the term of this patent is extended or adjusted under 35 U.S.C. 154(b) by 8 days.

(21) Appl. No.: 09/909,958

(22) Filed: Jul. 23, 2001

(65) Prior Publication Data

US 2002/0013642 A1 Jan. 31, 2002

Related U.S. Application Data

(62) Division of application No. 09/173,732, filed on Oct. 16, 1998, now Pat. No. 6,289,259.

(51) Int. Cl.⁷ .............................................. B29C 39/00
(52) U.S. Cl. ..................... 700/200; 425/135; 425/149
(58) Field of Search .............................. 264/40.1, 40.7; 425/135, 149; 700/135, 149, 200–203

(56) References Cited

U.S. PATENT DOCUMENTS

| | | | | |
|---|---|---|---|---|
| 4,525,134 A | * | 6/1985 | McHenry et al. ............ | 425/130 |
| 4,610,831 A | | 9/1986 | Mihara ......................... | 264/40 |
| 4,971,547 A | * | 11/1990 | Nett et al. .................... | 425/135 |
| 5,062,052 A | * | 10/1991 | Sparer et al. ................ | 700/197 |
| 5,641,523 A | | 6/1997 | Shioiri et al. ................ | 425/136 |
| 5,753,153 A | * | 5/1998 | Choi ........................... | 264/40.5 |
| 5,899,962 A | * | 5/1999 | Louwagie et al. .......... | 702/138 |
| 5,911,924 A | | 6/1999 | Siegrist et al. .............. | 264/40.1 |
| 5,912,020 A | | 6/1999 | Grunitz ........................ | 425/3 |
| 5,916,605 A | | 6/1999 | Swenson et al. ............ | 425/564 |
| 5,948,450 A | | 9/1999 | Swenson et al. ............ | 425/562 |
| 6,007,236 A | | 12/1999 | Maguire ...................... | 366/141 |
| 6,016,056 A | | 1/2000 | Seki ............................ | 324/165 |
| 6,056,536 A | | 5/2000 | Schad et al. ................ | 425/562 |
| 6,060,005 A | | 5/2000 | Hettinga ..................... | 264/40.5 |
| 6,089,534 A | | 7/2000 | Biegelsen et al. .......... | 251/129.01 |
| 6,089,849 A | | 7/2000 | Bulgrin et al. .............. | 425/149 |
| 6,120,277 A | | 9/2000 | Klaus .......................... | 425/145 |
| 6,120,711 A | | 9/2000 | Takizawa .................... | 264/40.1 |
| 6,182,019 B1 | * | 1/2001 | Wiklund ...................... | 702/100 |
| 6,289,259 B1 | * | 9/2001 | Choi et al. .................. | 700/197 |
| 6,568,279 B2 | * | 5/2003 | Behm et al. ................ | 73/756 |

FOREIGN PATENT DOCUMENTS

| | | |
|---|---|---|
| DE | 39 36 301 | 5/1991 |
| DE | 197 44 636 | 4/1998 |
| EP | 0 269 204 | 6/1988 |
| EP | 0 393 697 | 10/1990 |
| EP | 0 644 030 | 3/1995 |

* cited by examiner

*Primary Examiner*—Leo Picard
*Assistant Examiner*—Douglas S. Lee
(74) *Attorney, Agent, or Firm*—Katten Muchin Zavis Rosenman

(57) ABSTRACT

Apparatus and method for controlling a hydraulic actuator in an injection molding machine, where the hydraulic actuator moves in a linear or rotary manner to effect movement of an injection molding device, such as a mold clamp. A microcontroller is locally disposed adjacent to the actuator or the hydraulic fluid distribution manifold to cause the actuator to drive the device. The microcontroller is electrically coupled to the system control processor. This distributed control architecture increases system processing throughput, enhances reliability, and permits easier upgrades/repair. Preferably, the microcontroller is mounted on the manifold and controls all of the actuators supplied from that manifold.

16 Claims, 7 Drawing Sheets

INTELLIGENT HYDRAULIC MANIFOLD USED IN AN INJECTION MOLDING MACHINE

This is a divisional application of U.S. application Ser. No. 09/173,732, filed Oct. 16, 1998, now U.S. Pat. No. 6,289,259.

BACKGROUND OF THE INVENTION

1. Field of the Invention

The present invention relates to an apparatus and methods for controlling a hydraulic actuator for use in an injection molding machine, and more particularly to controlling such a hydraulic actuator (both linear and rotary) with a processor which is disposed locally near the actuator and/or the hydraulic manifold.

2. Related Art

Injection molding machines produce great quantities of products at high speed. For example, the widely-used PET plastic drink containers are made at production rates of thousands per hour. During these high speed operations, various injection molding machine devices (such as the molding clamp assembly, the injectors, various control switches, and other machine components) are moved using a number of hydraulic actuators. Such hydraulic actuators are supplied with pressurized hydraulic fluid that causes movement of an internal diaphragm or piston which, in turn, drives the molding device. A control valve controls the flow of hydraulic fluid to the actuator to control movement of the diaphragm. FIG. 1 depicts a typical control valve. In FIG. 1, the hydraulic actuator 2 includes a piston 4 which divides a chamber into two halves 6 and 8. Movement of the piston 4 drives a load 10, which, for example, may comprise a mold and clamp mechanism. A position sensor 12 senses the position of the load 10 and provides a feedback signal to a system controller (to be discussed below).

The hydraulic actuator 2 has two hydraulic fluid lines 64 and 84 which allow hydraulic fluid to enter and escape from the chamber halves 6 and 8, respectively. Pressure transducers 66 and 86 respectively monitor the pressure in line 64 and 84 and provide output signals to the system controller.

Hydraulic fluid from a pressure source (typically a hydraulic fluid pump; not shown in FIG. 1) is provided to valve 14 through hydraulic line 74, while hydraulic fluid may be returned from valve 14 to hydraulic fluid storage tank (also not shown in FIG. 1) through hydraulic line 94. Pressure transducers 76 and 96 respectively monitor the pressure in lines 74 and 94 and provide output signals to the system controller.

Valve 14 controls the flow of hydraulic fluid through the chambers of hydraulic actuator 2 to move the piston 4 back and forth thus driving the load 10. Valve 14 has fluid ports A, B, P, and T which are respectively coupled to the hydraulic lines 64, 84, 74, and 94, as shown. The valve 14 has a straight flow section 142 and a cross-flow section 144 which are respectively driven by solenoids 146 and 148 in order to control the flow of fluid within the valve. For example, when the straight flow section 142 is driven to the A, B, P, and T ports, pressurized fluid will flow through lines 74 and 64 into chamber 6, driving the piston 4 toward the load 10. On the other hand, if cross-flow section 144 is driven to the ports A, B, P, and T, then pressurized hydraulic fluid will be provided through lines 74 and 84 to the chamber 8, driving the piston 4 away from the load 10.

In the related art, control of the hydraulic actuator 2 through the valve 14 was a relatively straightforward process. For example, U.S. Pat. No. 5,062,052 (incorporated herein by reference) discloses that such actuators may be controlled with an analog signal processor and/or a programmable logic controller which are disposed at a location remote from the injection molding actuators so that the processing circuitry is not damaged by machine heat and vibration. Typically, the analog signal processor and/or the programmable logic controller will perform closed-loop control of the actuator 2 through valve 14 in order to keep load 10 moving within the prescribed operational ranges. The analog signal processor and/or programmable logic controller will receive feedback signals from the pressure transducer units 66, 76, 86, and 96, and position information from position sensor 12 in order to control valve 14 according to a predetermined control program. The analog signal processor can also effect operational changes in the operation of the actuator 2 through command signals received through the programmable logic controller, for example to change the molding and clamping times used by load 10.

The programmable logic controller stores a plurality of predetermined control programs which cause the analog signal processor to control the analog devices of the injection molding machine. The programmable logic controller may also include circuitry for controlling the digital devices in the injection molding machine, for example, digital solenoid valves and proximity switches. The programmable logic controller thus controls the elements of the injection molding machine either through the analog signal processor or directly through the digital devices.

In the control scheme of the '052 Patent, however, the analog signal processor and the programmable logic controller are required to perform command and control operations for all of the various devices in the machine. This imposes a processing bottleneck. For example, the programmable logic controller may attempt to execute closed-loop control of multiple different analog devices at the same time. Typically, faster and more powerful processors have been used in an attempt to overcome such problems. Such expensive solutions have, nevertheless, been unable to solve the control timing problems experienced in known actuator control architectures.

Another problem with the known control architecture is the reliability of the analog signal processor and the programmable logic controller. If either one of these components fails, the entire machine must be stopped until a replacement is located, installed, and programmed to operate in the specified machine. Since each actuator in every machine has unique operating characteristics, the newly-installed processor(s) must be re-programed and/or re-parameterized with the operating characteristics of the corresponding actuator(s) before full-scale production can be resumed.

Furthermore, the dedicated wiring inter-connections used for communication between the analog signal processor and the programmable logic controller to each actuator results in a plurality of wires which are difficult to install, maintain, and repair.

Thus, a need exists for a control architecture for hydraulic actuators in an injection molding machine which provides fast, flexible, and reliable control of the actuators.

SUMMARY OF THE INVENTION

An object of the present invention is to overcome the problems noted above by providing a local processor disposed near the actuator so that control functions are moved closer to the actuator and away from the central processor. Preferably, a microcontroller is mounted directly on each hydraulic fluid distribution manifold, and this microcontroller controls the actuators coupled to that manifold. Each hydraulic actuator can be controlled from a local processor, eliminating the need for a great number of wires between the actuator and the analog signal processor and/or the machine controller, such as a programmable logic controller. This enables modular control sub-systems to be realized. Also, a failure of any manifold-mounted microcontroller will only require its replacement, not the replacement of the central controller or the other manifold microcontrollers.

According to a first aspect of the present invention an intelligent hydraulic actuator for use in an injection molding machine which also has a system controller includes a hydraulic actuator for moving in a linear or rotary manner between first and second positions, or for generating forces or torque in response to hydraulic flow and pressure, respectively. A microcontroller is disposed adjacent the actuator for causing the actuator to move between the first and second positions. The microcontroller is also coupled to the system controller.

According to another aspect of the present invention, apparatus for controlling a hydraulic actuator in an injection molding machine having (i) a hydraulic manifold for supplying hydraulic fluid to the hydraulic actuator, (ii) a system control processor, and (iii) a sensor for sensing the operational conditions of the hydraulic actuator includes a processor which controls movement of the actuator. The processor has a memory for storing at least one control program which the processor runs to control the movement. The processor is mounted on the manifold. A command input provides command signals from the system control processor to the local processor, and a control output provides control signals from the processor to a hydraulic valve, thus controlling the actuator.

According to yet another aspect of the present invention, an injection molding machine includes a plurality of molding devices which perform an injection molding operation, and a system control processor for causing the plurality of molding devices to perform the injection molding operation. A plurality of hydraulic actuators are provided for respectively moving the plurality of molding devices, and a plurality of valves respectively provide hydraulic fluid to the hydraulic actuators to move the plurality of molding devices. A manifold provides hydraulic fluid to the plurality of valves. A processor is disposed adjacent at least one of (i) the manifold, and (ii) at least one of the plurality of valves. The processor is coupled to each of the plurality of valves and to the system control processor. The processor stores a control program for each of the plurality of hydraulic actuators coupled thereto, and the processor controls the plurality of valves based on the stored control programs and command signals received from the system control processor.

In another aspect of the present invention, a method of controlling a hydraulic actuator which is supplied with hydraulic fluid from a controllable valve and a manifold includes the steps of (i) disposing a microcontroller adjacent the manifold, (ii) storing in the microcontroller a control program for controlling a movement of the hydraulic actuator, (iii) providing to the microcontroller feedback signals from a sensor which senses a performance characteristic of the hydraulic actuator, (iv) providing to the microcontroller command signals from the system control processor, (v) calculating, in the microcontroller, control signals to control the valve to cause the movement of the hydraulic controller, the microcontroller being capable of calculating the control signals based on one or more of the feedback signals, the command signals, and the stored control programs, and (vi) transmitting the control signals to the controllable valve.

According to a further aspect of the present invention, apparatus for controlling non-linear characteristics of a hydraulic actuator having a valve and a feedback sensor includes a memory for storing multi-dimensional data regarding operational characteristics of the valve, and a processor. The processor receives feedback signals from the feedback sensor, determines operational data from the multi-dimensional data stored in the memory based on the received feedback signals, generates control signals by applying an inverse function to the operational data in order to control for non-linear characteristics of the hydraulic actuator, and outputs the control signals to the valve.

A further aspect of the present invention involves apparatus for controlling a hydraulic actuator comprising a first valve coupled to the actuator and causing movement of the actuator by controlling movement of hydraulic fluid through the valve, a second valve coupled to both the first valve and the actuator for causing movement of the actuator by controlling movement of hydraulic fluid through the first valve and the second valve, and a microcontroller, disposed adjacent to the valves, for controlling the first valve and the second valve to cause regenerative and non-regenerative control of the actuator.

An additional aspect of the present invention features at least one computer-readable storage medium storing an instruction set which causes a microcontroller to control a hydraulic actuator and an injection molding machine by performing the steps of: (i) storing a control program which provides control signals based on feedback signals from at least one sensor which monitor operational parameter(s) of the actuator, (ii) receives feedback signals from the sensor(s), (iii) receives command signals from an injection molding system control processor, (iv) modifies the stored control program based on the received command signals, (v) generates actuator control signals based on one of the stored control program and the modified stored program, and (vi) outputs the actuator control signals to the actuator.

BRIEF DESCRIPTION OF THE DRAWINGS

The present invention will be more readily understood from a detailed description of the preferred embodiments taken in conjunction with the following figures.

DETAILED DESCRIPTION OF THE PREFERRED EMBODIMENTS

1. Introduction

Figure 1:
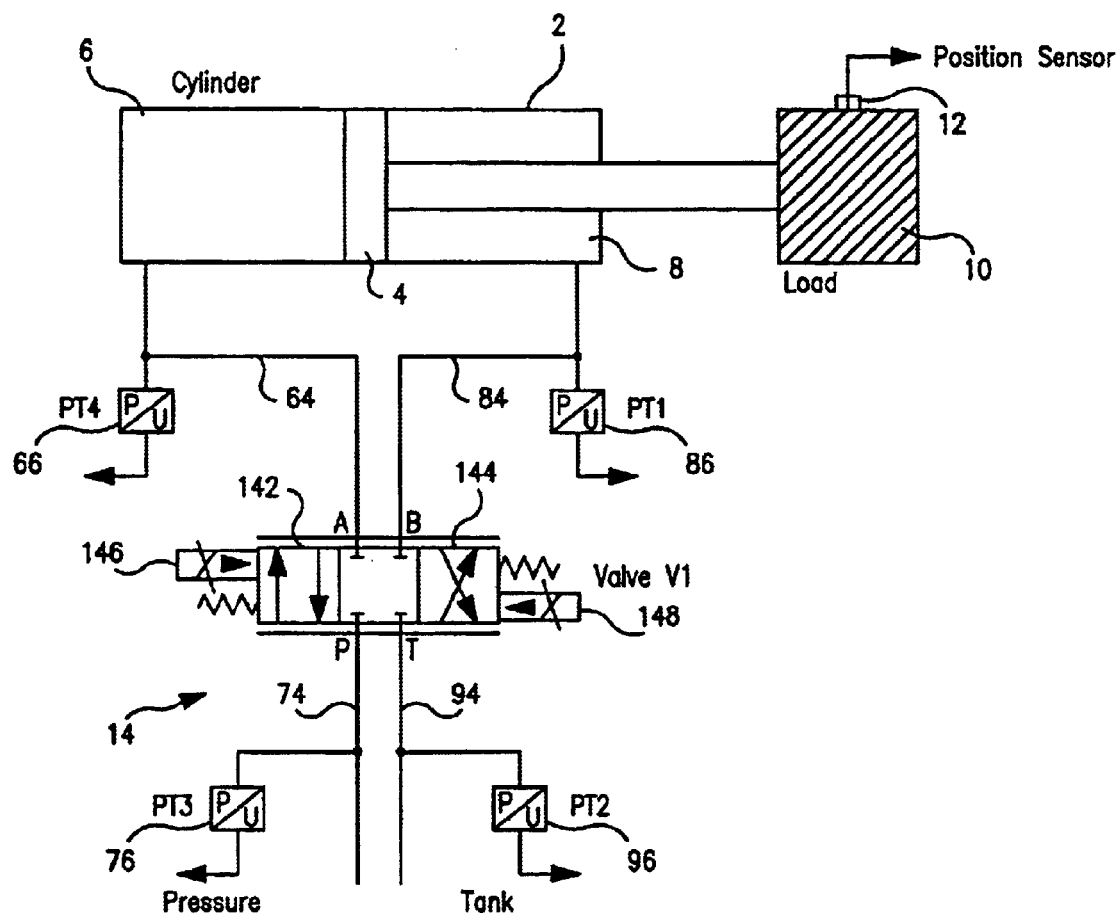
FIG. 1 is a schematic representation of a typical hydraulic actuator and valve used in an injection molding machine.

The present invention will be described with respect to controlling hydraulic actuators (both linear and rotary) in an injection molding machine. However, the invention is not limited to injection molding machines and will solve actuator control problems in a wide variety of applications. For example, the fluid described below could be any known liquid or gas useful in controlling an actuator. The scope of the present invention is to be ascertained from the appended claims and not the detailed description of the preferred embodiments.

The present invention features a computer, processor, microcontroller, or microcontroller mounted on a hydraulic fluid manifold and/or actuator to provide localized control, enhanced reliability, and reduced wiring in hydraulic actuator control systems. Mounting the processor on the manifold and/or actuator thus incorporates the processing and control functionality of a process control unit in an integrated mechanical assembly including hydraulic control valves with digital (on-off switching), proportional and servo functions, and the corresponding valve driver electronics, together with pressure transducers for pressure measurements and linear/rotary transducers for actuator position. Thus, a closed-loop control system can be realized locally without requiring system control resources. Apart from providing the processed control functions mentioned above, the on-board computer possesses communication capability either through the discrete control signals (digital and/or analog) or a field bus which enables networking the local microcontroller to the system control processor and/or other processors disposed within the factory. For field bus or device-level networks, the local microcontroller can be decentralized via fiber optic cable(s), twisted wire pairs, or other communications means. The decentralized network capability offered by a field bus improves the control system flexibility.

Incorporating the computer and communication capabilities of a processor at the local manifold and/or actuator, makes it possible to distribute intelligent process control as close as possible to the actuators throughout the system. Such manifold-mounted processors having integral field bus connectivity enable control to be decentralized throughout the system. The addition of the on-board intelligence (computation) capability of the local microcontroller provides local control of the sub-system. This enables proprietary control techniques and process knowledge to be utilized, yet be open for easy connection to other sub-systems for system integration. Proprietary control techniques such as flow rate linearization (to be discussed below) and dynamic spool cut adaptation (also to be discussed below) can be migrated to the localized on-board computer. In addition, the on-board computer provides additional diagnostics to the components of the local sub-system, and data acquisition for quality control and monitoring. The on-board computer reduces the complexity of the system control processor and enhances the modularity of the system. Now, when problems occur in one local sub-system, it is not necessary to take the whole machine off-line and re-configure the entire control system. Instead, the local microcontroller can be replaced and/or reprogrammed to rapidly overcome the sub-system problem and return the machine to full production.

The preferred embodiment incorporates an on-board microcontroller mounted on a hydraulic manifold which supplies hydraulic fluid to a plurality of valves which, in turn, are coupled to a plurality of hydraulic actuators. Communication of control and feedback information between the manifold and the system control processor can be carried out with discrete input and output signals in analog or digital form. A standardized industrial fieldbus can also be incorporated to enhance communication with reduced connections. With a single communication point for each sub-system, the overhead to support multiple fieldbus devices is greatly reduced which results in higher response controls from the control system. The hydraulic manifold thus becomes an "intelligent" manifold which can perform functions which would not be possible otherwise. Since the processing power demanded from the system control processor is reduced, an overall improvement in system performance and speed is realized. When a fieldbus is used to connect the manifold microcontroller to the system control processor, the system cost for complex manifolds with multiple devices is significantly reduced. The local control of the manifold sub-system thus enables factory calibration and performance characteristic curves for every individual device to be stored in the memory of the on-board microcontroller. This allows additional fine-tuning of the local sub-systems by advanced control strategies and algorithms which, for example, may linearize the feedback from the measurements of the transducers and the control elements. In addition, change of components may be realized by merely revising the data stored in the microcontroller. This can be done by loading into the microcontroller one or more software programs stored on one or more computer-readable storage mediums such as diskettes, CD-ROMs, tapes, pre-programmed microcontrollers, EEPROMs, optical-magneto devices, etc. The programs may be loaded into the microcontroller from the system controller, through a network connection, or directly into the local microcontroller.

2. The Structure of the Preferred Embodiment

Figure 2:
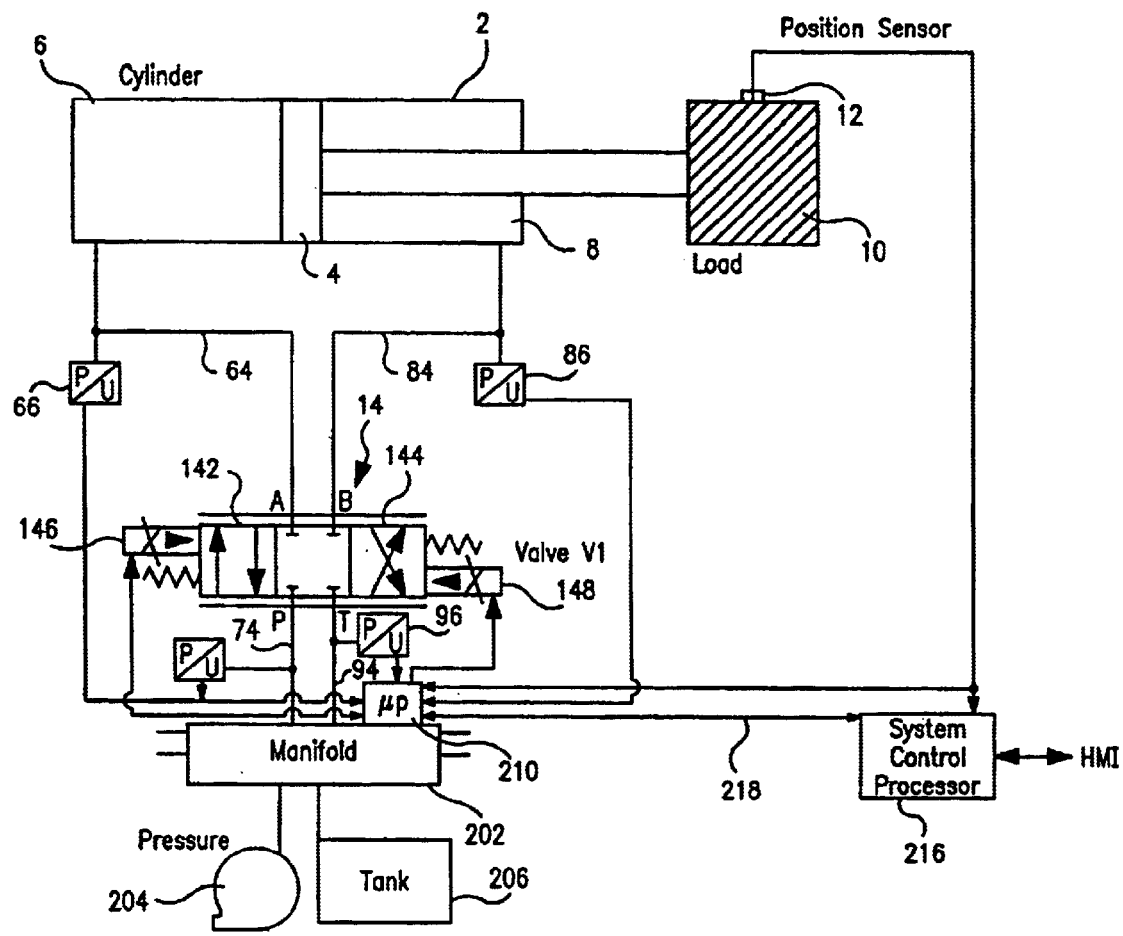
FIG. 2 is a schematic block diagram of a first embodiment according to the present invention.

FIG. 2 is a schematic block diagram of one structure according to the preferred embodiment in which the same structure as discussed above with respect to FIG. 1 is depicted with the same reference numerals. In FIG. 2, a hydraulic manifold 202 receives pressurized hydraulic fluid from a pressure source (e.g. a pump, or an accumulator and pump) 204, and returns hydraulic fluid to a tank 206. Hydraulic pressure and return lines extend from the manifold 202 to various valves which operate different hydraulic actuators. In FIG. 2, the manifold 202 provides pressurized and returned hydraulic fluid to the valve 14 discussed above in FIG. 1.

The microcontroller 210 is in close proximity (e.g. within one meter) to the manifold 202 to control the operations of the valve 14, and thus the actuator 2. The microcontroller 210 may also control the other valves and actuators coupled to the manifold 202. While FIG. 2 depicts the microcontroller 210 mounted on the manifold 202, the microcontroller may be mounted adjacent the valve 14 or the actuator 2. So long as the microcontroller is mounted locally, the processing advantages achieved by the present invention can be realized.

As shown in FIG. 2, the microcontroller 210 is coupled to the pressure transducers 66, 76, 86, and 96 to monitor the pressure going into and coming out of the valve 14. The microcontroller 210 also receives position information from the position sensor 12 coupled to the load 10. The microcontroller 210 may also receive feedback signals from other system sensors which monitor various operational characteristics of the hydraulic actuators to be controlled by the microcontroller. Accordingly, the microcontroller 210 can execute closed-loop control of the actuator 2 through control of the valve 14. In particular, the microcontroller 210 has a ROM (not shown) and a RAM (also not shown) which store one or more control programs which the microcontroller 210 executes to control the solenoid drivers 146, 148 of the valve 14. Since the microcontroller 210 contains all necessary programs and receives all necessary feedback, control can be executed without reference to the system control processor 216. The microcontroller 210 will provide feedback, status, and operational information to the system controller 216 which, in turn, can command the microcontroller 210 to switch control programs or to modify the programs being executed. When the new control programs are desired to be installed in the microcontroller 210, these can be installed locally at the manifold, or can be installed through the system control processor 216.

The microcontroller 210 preferably includes D/A and A/D circuitry so that it can locally control both digital and analog drivers required by the sub-system hydraulic actuators.

The microcontroller 210 can be any commercially available microcontroller for embedded controls processor such as a Pentium II processor with one Gigabyte ROM and 64 MB of RAM. The microcontroller may also be termed a microprocessor, a computer, a processor, or other terms known to those of skill in the injection molding art. However, the term microcontroller is preferred due to its meaning in this art.

The system control processor 216 performs overall process control for the injection molding machine and schedules control signals to be supplied to the microcontroller 210. Such signals may include those for calculating the minimum output to a valve based on a velocity profile with a pressure limit. The system control processor 216 may receive feedback information from the microcontroller 210 and/or the position sensor 12. This information may include actual pressure, current position, etc. The system control processor 216 also receives information from a human machine interface, such as an operator-set velocity profile, pressure limits, temperature set points, etc. Such information is provided to the microcontroller 210 which then decides on the correct outputs to the solenoid valve drivers 146 and 148.

The control architecture depicted in FIG. 2 provides great flexibility in controlling the injection molding machine. Actuator control functions can reside in the microcontroller 210 and/or the system control processor 216. In a machine with a great number of sub-systems, most of the control functions will be migrated to the individual microcontroller(s) 210. In machines with fewer sub-systems, the system control processor 216 may carry out some of the machine control functions.

The microcontroller 210 can be installed in a relatively simple system with a single valve, with the microcontroller storing minimal control programs for controlling a single actuator. Or, the microcontroller 210 can be installed as a sophisticated control controlling multiple valves, multiple axes of control, and store control programs for each actuator, as well as control programs for synchronizing the operation of all of the sub-system actuators. The microcontroller 210 may store control programs such as: valve displacement vs. flow at a given pressure drop; integrated processing and scheduling power for each actuator; closed-loop pressure and/or force control with integrated pressure transducers; so-called "sanity" checks, for example, actuator velocity with respect to position information from the position sensor 12; defined interface protocol; individualized actuator strokes (linear), areas (linear), and geometric displacements (rotary); inferred friction, natural frequency, etc.; and physical limits (displacement limits, velocity limits, acceleration limits, jerk limits, force limits, pressure limits, rate of pressure change limits, etc.).

The microcontroller 210 may, in fact, be standardized for any manifold controlling a simple actuator, such as that depicted in FIG. 2. The control program may be identical for different sizes of valves and actuators, and only the initialization parameters (actuator and valve information) need to be input at the start-up period.

Preferably, the connection between the system control processor 216 and the microcontroller 210 is a fieldbus 218. This is a bi-directional bus which may comprise optical cable, a twisted pair, or other suitable communications means. The field bus is capable of handling high speed information exchange and can thus provide real-time control between the system control processor 216 and the microcontroller 210. The system control processor 216 can send control signals to the microcontroller 210 such as to initiate process signals, scheduling signals, control programs updates, etc. In turn, the microcontroller 210 can send feedback signals to the system control processor 216 such as valve status, pressure levels, position sensor status, stored reliability information, etc.

3. Non-Linear Compensation

Hydraulic actuators possess non-linear characteristics such as change in hydraulic stiffness due to the change in oil volume between the valve and the cylinder piston and pressure-dependent flow, but the actuator should be operated in the linear region for effective parameter control. For example, the non-linear characteristics can lead to loss of control or even closed-loop instability. By providing increased processing power adjacent the hydraulic manifold, it is possible to compensate for the non-linear characteristics of each hydraulic actuator to ensure reliable operation. The microcontroller 210 can store a control program which compensates for such non-linear characteristic and ensures linear control of the hydraulic actuator. Referring to Diagram A below, the compensation method according to the present invention will compensate for the main nonlinearity if by an approximate inverse function $f^{-1}$, which can be implemented in the controller. According to Diagram A, the regular actuator input U is then substituted by the "corrected" value such that the relationship between U and y becomes approximately linear. Here $G_A$ represents the dynamics of the control valve, $G_p$ the mechanical system, and x the process states and variables.

Diagram A: Inverse Function

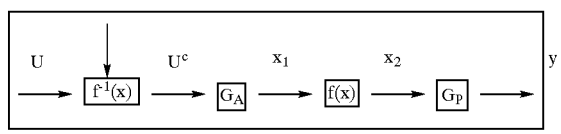

The nonlinear relation $f^{-1}$ follows from:

$$U^c = U \cdot f^{-1}(x) \qquad (1)$$

$$x_2 = U^c \cdot K_A \cdot f(x) \qquad (2)$$

and $$x_2 = K \cdot U \qquad (3)$$

where K describes the determined gain of the linearized system and $K_A$ describes the gain of the input system $G_A$. The dynamics of the valve, $G_A$, are often negligible compared with the time constants of $G_P$ (control valve versus mechanical system dynamics). If f(x) could offer a precise approximation, good and robust compensation results would be obtained.

Flow Rate Linearization

Consider the sharp edge orifice's relationship:

$$q_l = k_v \cdot a(x_v) \cdot \sqrt{p_{s-p_l}} \quad (4)$$

where:
$q_l$=Load Flow $$k_v = \text{Valve Coefficient} = C_d \cdot \sqrt{\frac{2}{\rho}} \quad (5)$$

Figure 3:
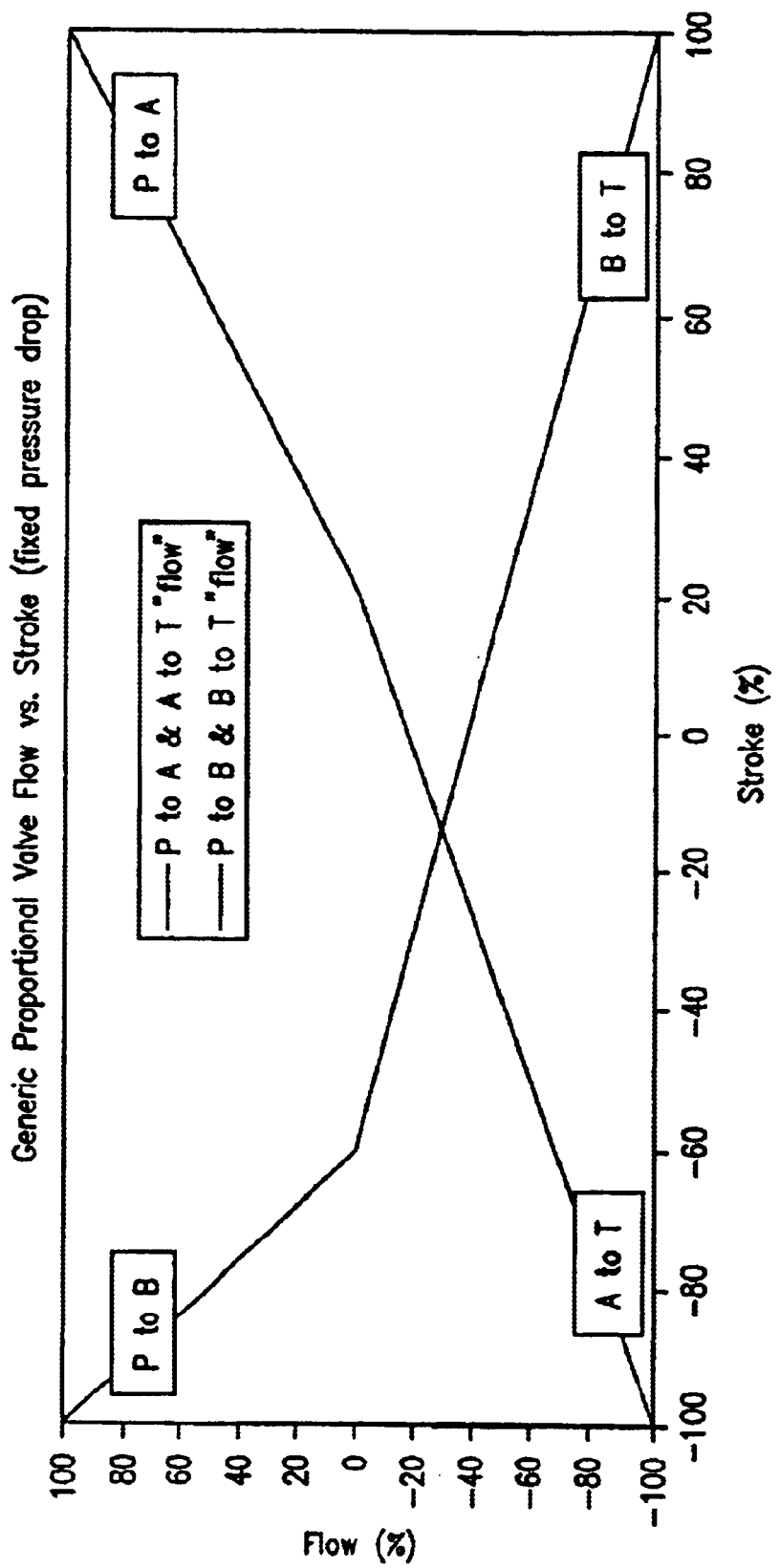
FIG. 3 is a graph demonstrating proportional valve flow vs. stroke according to an embodiment of the present invention.

$a(x_v)$=Orifice Area For a Given Valve Stroke Position $x_v$
$p_s$=Supply Pressure
$p_l$=Load Pressure
$C_d$=Valve Flow Characteristic
$\rho$=Fluid Density Single Valve/Single Axis/Minimum Self Knowledge/Minimum Axis Knowledge The valve characteristic of flow vs. valve stroke at a fixed pressure drop (see FIG. 3) resides in the Intelligent Manifold Controller. This characteristic is used to calculate the actual flow through the controlling valve by determining what the current pressure drop is and scaling the valve characteristic pressure drop to the actual pressure drop using the following formula:

$$Q_{actual} = Q_{characteristic} \cdot \sqrt{\frac{\Delta P_{actual}}{\Delta P_{characteristic}}} \quad (6)$$

Equation 4 can be rewritten as:

$$q_1 = k_v \cdot a(x_v) \cdot \sqrt{r \cdot p_s} \cdot \sqrt{\frac{p_s - p_1}{r \cdot p_s}} = k_v \cdot a(x_v) \cdot \sqrt{r \cdot p_s} \cdot f(p_x) \quad (7)$$

with
 r=Compensation Ratio
 $f(p_x)$=Pressure Valve For Spool Position x
 $p_x$=f($p_s$, $p_l$)
and by selecting an inverse function:

$$f^{-1}(p_x) = \sqrt{\frac{r \cdot p_s}{p_s - p_1}} \quad (8)$$

the compensated flow will have the following relationship:

$$q_l^c = k_v \cdot a(x_v)\sqrt{p_{s-p_l}} f^{-1}(p_x) = k_v \cdot a(x_v)\sqrt{r \cdot p_s} \quad \ldots (9)$$

The parameter r provides a means to adjust the flow gain of the valve. The flow gain of the valve is limited by the system pressure and maximum area opening of the orifice. The following flow characteristic curves help to illustrate the effects of the compensation based on different r values.

Figure 4:
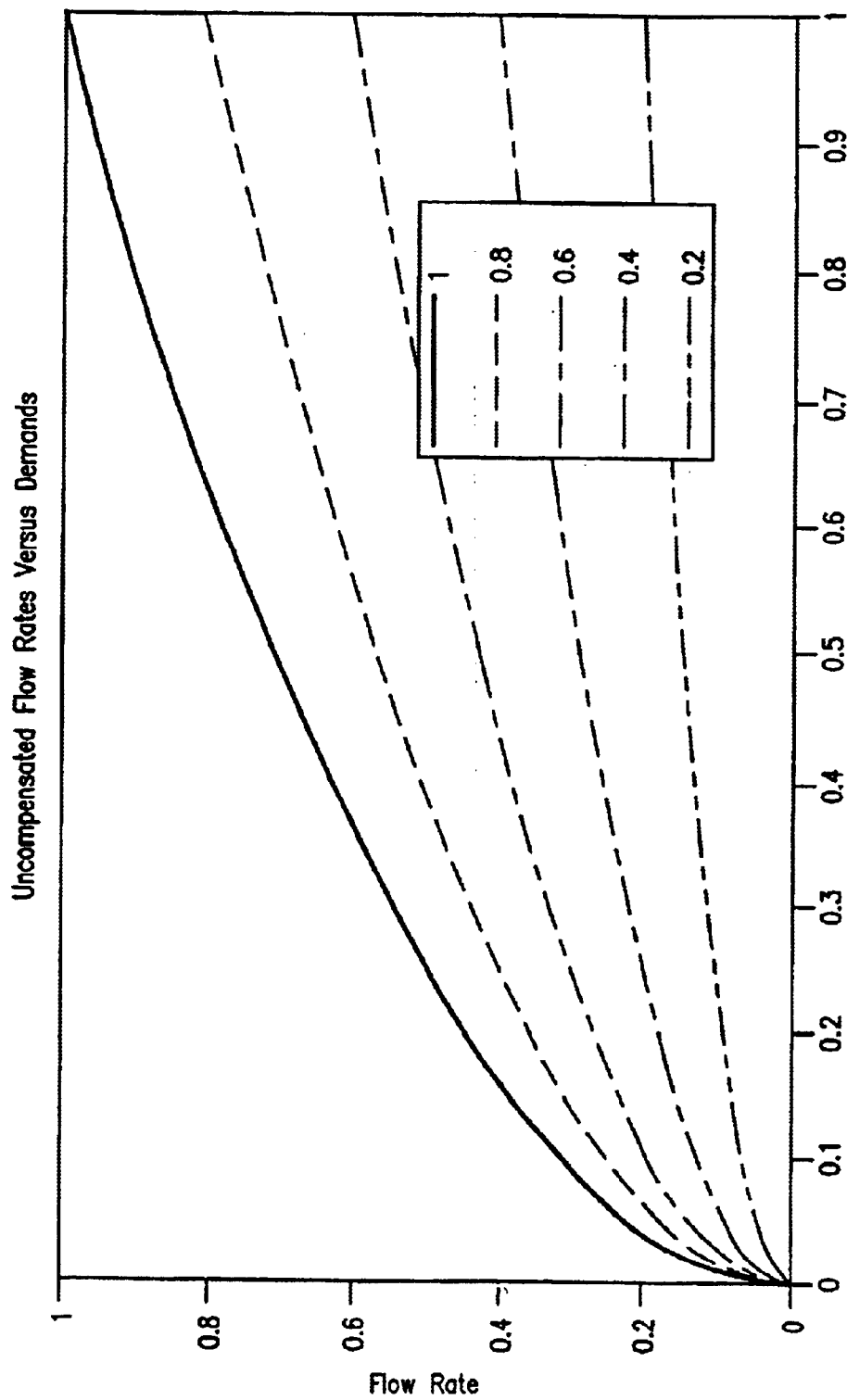
FIG. 4 is a graph demonstrating flow rate vs. demand according to an embodiment of the present invention.

FIG. 4 is a graph depicting the uncompensated flow rate versus demand. By increasing the value of r, the flow gain could be increased until the saturation limit is reached. With a value of r larger than 0.5, flow gain starts to show nonlinear behavior due to valve saturation, for $p_1$ at greater than half the supply pressure. For proper performance, the value of r is limited to 1.

Figure 5:
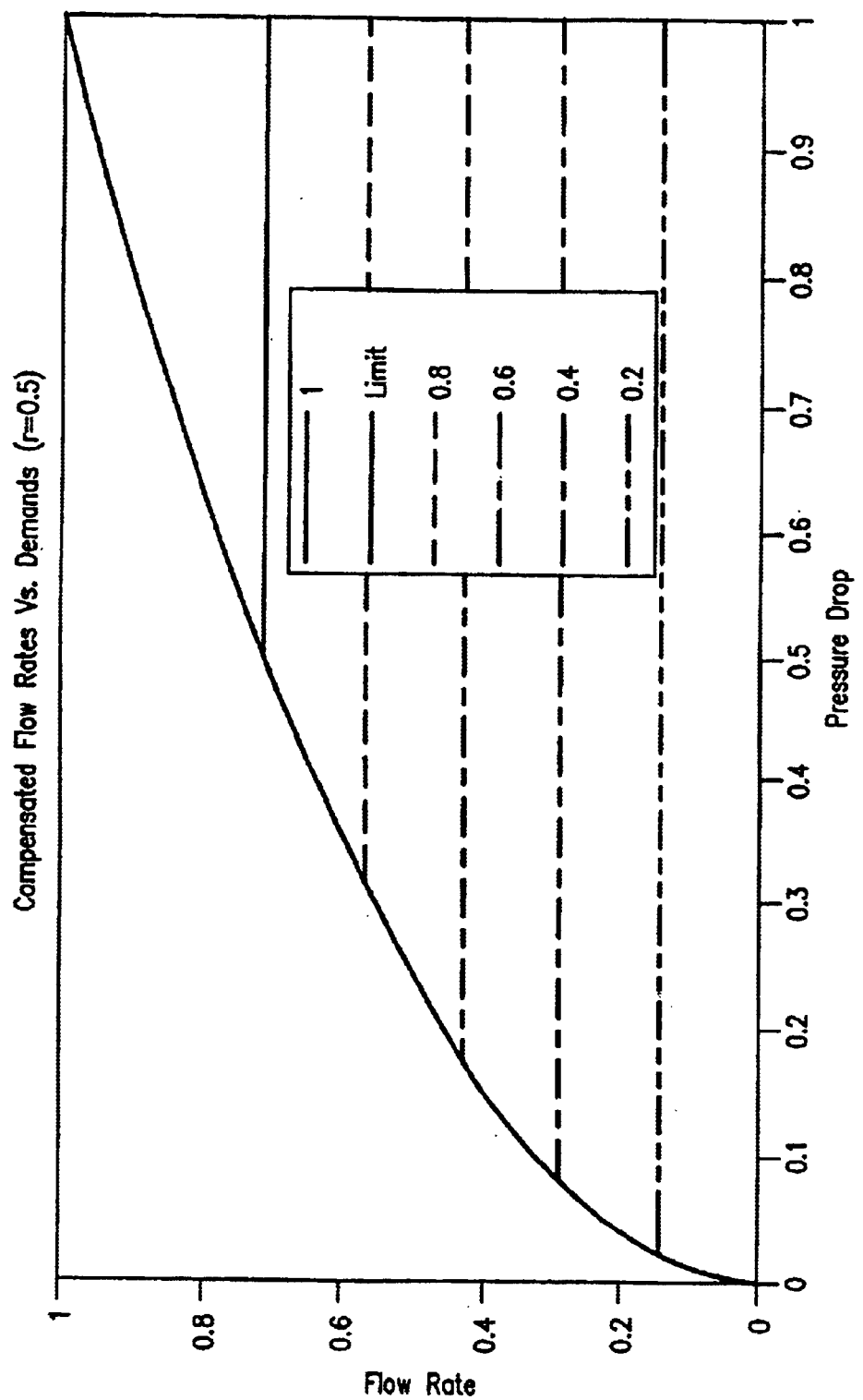
FIG. 5 is a graph depicting flow rate vs. demand in an embodiment according to the present invention.
Figure 6:
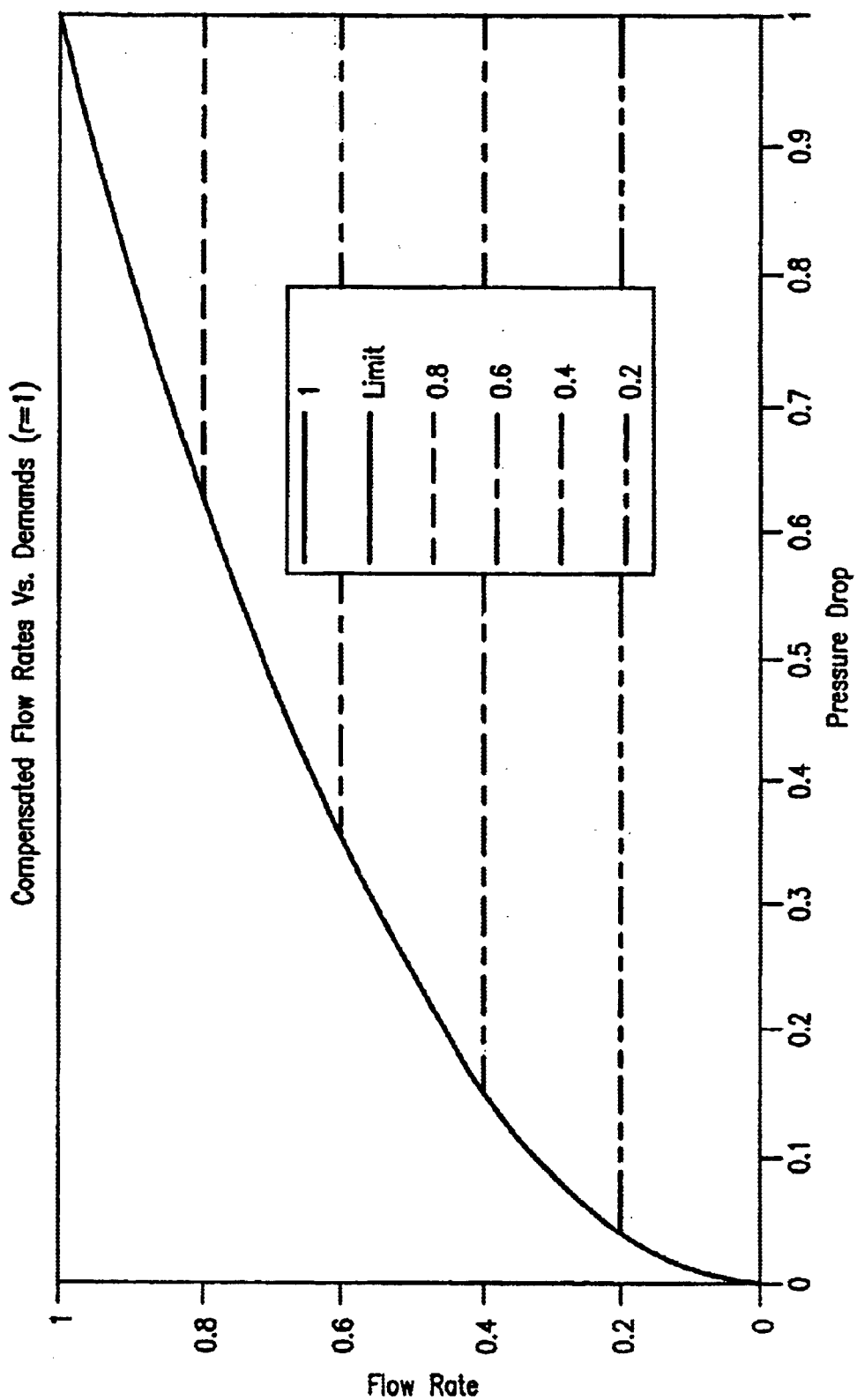
FIG. 6 is a graph depicting compensated flow rate vs. demand according to an embodiment of the present invention.

FIG. 5 depicts compensated flow rate versus demand for r=0.5. FIG. 6 shows compensated flow rate versus demand where r=1.

4. Dynamic Spool Cut Tuning

A single valve controlling an axis has a fixed relationship between the connection of each valve port (i.e. P, T, A, and B), since the spool is one piece. Currently, the spool cut (the cut of the orifices leading into the chambers) is typically tuned to the ratio of the cylinder (i.e. 2:1, 10:1, etc.). This fixed opening ratio works well for the case of constant velocity, but there is currently no way to adjust the ratio of the valve opening after the system is constructed.

Figure 7:
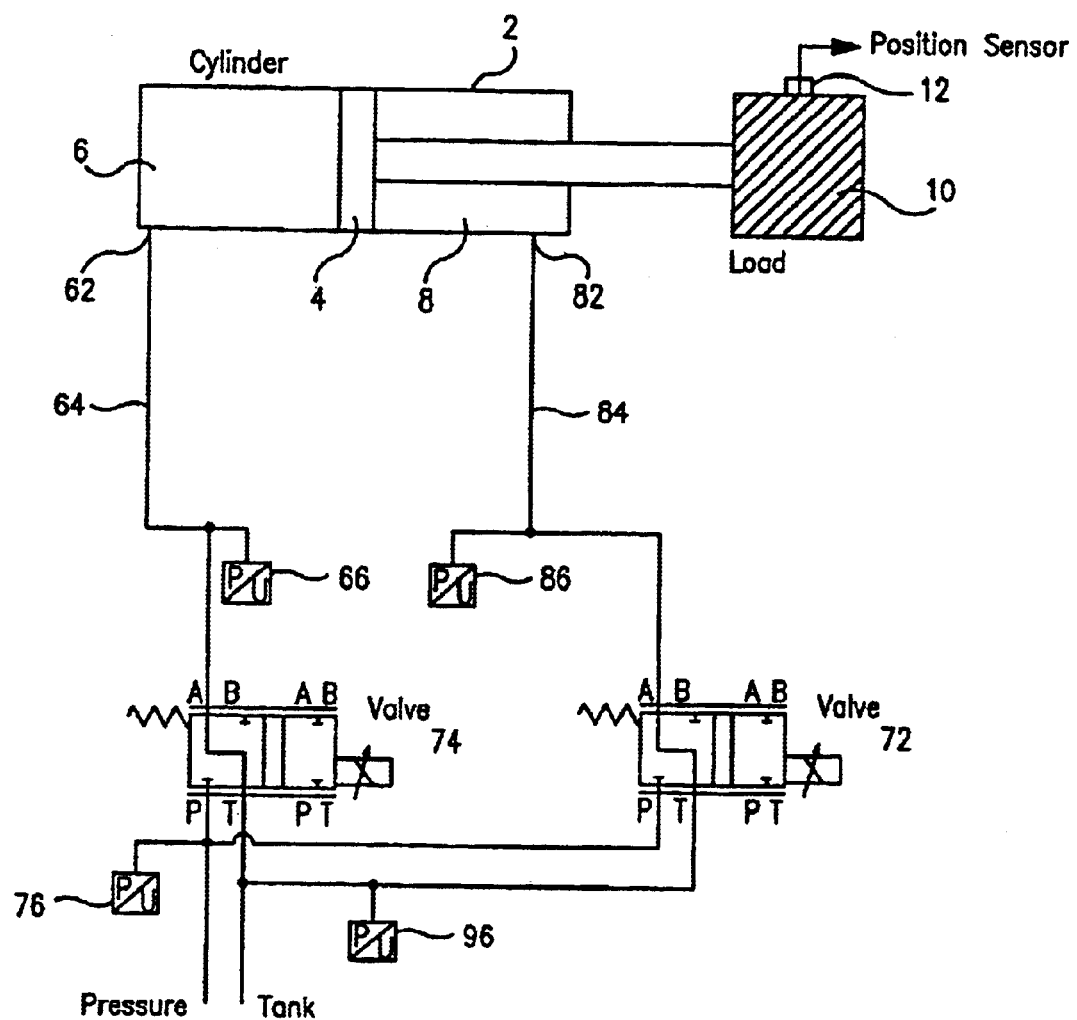
FIG. 7 is a schematic block diagram depicting a two-valve embodiment according to the present invention.

A solution to this problem is to use two three way (P, T, and A) proportional (servo) valves (FIG. 7, valve 72 and valve 74). These valves in conjunction with pressure transducers 66, 76, 86, and 96 in the P, T, and A ports of the valves 72, 74 allow profiling the pressure or flow into and out of the actuator cylinder (this could also be a rotary actuator). This system may be used to:

1. Operate an axis regeneratively (i.e., return hydraulic fluid from one valve to another) under some situations and non regeneratively (fluid is returned to the storage tank) for other situations.
2. Profile the pressure in the actuator to get the optimum acceleration, velocity, force control, deceleration, jerk, etc. for the system.

TABLE 1

Sequence Chart

| Function | Valve 74 | Valve 72 |
|---|---|---|
| Rod Extend (non regenerative) | High Signal (P to Cylinder) | Low Signal (Cylinder to Tank) |
| Rod Extend (regenerative) | High Signal (P to Cylinder) | High Signal (Cylinder to P) |
| Rod Retract | Low Signal (Cylinder to T) | High Signal (P to Cylinder |

This embodiment creates an additional degree of freedom for axis control. This embodiment can seamlessly adjust the orifice metering in and/or metering out hydraulic fluid (oil) from each side of the cylinder independent of what the other valve is doing. The additional degree of control freedom eliminates the requirements of a specially designed spool cut for a single control valve.

This embodiment also dynamically adjusts the valve openings based on the required flow to the axis and the supply and load pressures. This control is done locally (at the manifold microcontroller) and does not create any processing overhead to the system controller. The complexity of the control algorithm is transparent to the other parts of the system. The combined assembly can be considered as a single valve with an optimum spool cut design for any application.

5. Additional Embodiments

An intelligent manifold with embedded microcontroller permits the microcontroller to learn about the system that it is attached to, and to store such characteristic information for more precise control of the actuator. Some examples of such stored learning include:

The static and dynamic friction of the axis, and how the dynamic friction changes with velocity, position and/or over time;

Changes in the friction values from the last time the system was operated;

Changes in the trend of axis friction over time; (this allows for adjustments in the control system and for predictive maintenance to be used)

The effective axis mass, and any changes over time; and

Natural frequency of axis at different positions (oil volume, mass).

Also, the local microcontroller may store additional operational parameters to further enhance precision. These parameters may be provided to the system controller for use therein in system wide operational control. For example, the following parameters may be determined by the local microcontroller and stored therein and/or sent to the system controller:

Actuator displacement limit;

Actuator velocity limit;

Actuator acceleration profile;

Actuator jerk limit;

Pressure limits;

Rate of pressure change profile; and

Rate of pressure change limit.

Furthermore, the following local microcontroller-generated parameters may be stored in the microcontroller and transmitted to the system controller for the operator to use in operation of the injection molding machine:

Actuator displacement;

Velocity profile & force limit;

Force profile & velocity limit; and

Acceleration profile.

The following Tables A and B list some of the actuator and/or system parameters which may be controlled by the local microcontroller disposed near the actuator.

TABLE B

Velocity and Force Limits

| Velocity (flow) | Force (pressure) | Comment |
|---|---|---|
| 0 | 0 | Position Control without a Force limit. External force will move axis to a new position |
|  | 0 < F < System Limit | Position Control with a Force limit External force above a certain level will move axis to a new position |
|  | System Limit | Position Control with out a Force limit External force will not move axis. Positional restraining force limited by the capability of the axis |
| $0 < \frac{dx}{dt} <$ System Limit | 0 | Velocity Control |
|  | 0 < F < System Limit | Velocity Control |
| System Limit | System Limit | Velocity Control |
|  | 0 | Force Control |

TABLE A

System Parameters

| What? | Symbol | Current Art | Problem |
|---|---|---|---|
| Displacement | x | Magnetostrictive Device | None |
| Velocity (flow) | $\frac{dx}{dt}$ | Magnetostrictive Device PLC calculation of time rate of change of displacement | Differentiation creates noisy signal PLC differentiation creates time delay |
| Acceleration | $\frac{dx^2}{dt^2}$ | Magnetostrictive Device PLC calculation of time rate of change of velocity | Differentiation creates noisy signal PLC differentiation create time delays Hard to calculate on line |
| Jerk | $\frac{dx^3}{dt^3}$ | Magnetostrictive Device PLC calculation of time rate of change of acceleration | Differentiation creates noisy signal PLC differential creates time delays Hard to calculate on line |
| Pressure | P | Pressure transducer | None |
| Force (pressure) | Pressure × Area | Pressure transducer PLC calculation | None |
| Force (friction) | Mass × $\mu$ | None for on line | N/A |
| Wear | N/A | None for on line | N/A |
| Preventative Maintenance | N/A | None for on line | N/A |
| Diagnostics | N/A | None for on line | N/A |
| System identification | N/A | None for on line | N/A |

TABLE B-continued

Velocity and Force Limits

| a e | Velocity (flow) | Force (pressure) | Comment |
|---|---|---|---|
| | System Limit | 0 < F < System Limit | Force Control |
| | | System Limit | Force Control |

6. Conclusion

Thus, what has been described is an intelligent hydraulic manifold with local processor control to distribute the control functions closer to the controlled units, improve system processing performance, enhance reliability, provide greater system flexibility for upgrades/repairs, and reduce system downtime.

While the present invention has been described with respect to what are presently considered to be the preferred embodiments, it is to be understood that the invention is not limited to the disclosed embodiments. To the contrary, the invention is intended to cover various modifications and equivalent arrangements included within the spirit and scope of the following claims. The scope of the following claims is to accorded the broadest interpretation so as to encompass all such modifications and equivalent structures and functions.

What is claimed is:

1. Apparatus configured for controlling a hydraulic actuator in an injection molding machine having a system control processor performing overall process control of the injection molding machine, said apparatus comprising:
    a microcontroller configured to control the operation of a hydraulic control valve that regulates a supply of hydraulic fluid to the hydraulic actuator to control movement thereof, the microcontroller being remotely located from the system control processor and responsive to command signals from the system control processor, the command signals received by the microcontroller being configured to cause local control of the hydraulic control valve, said microcontroller generating control signals for communication to the hydraulic control valve in response to the command signals;
    a communications link configured to connect said microcontroller to the system control processor and to the hydraulic control valve, the communication link being configured to carry bi-directional communications;
    a sensor configured to monitor the hydraulic actuator and send, in response to an operational condition of the hydraulic actuator, feedback signals to the microcontroller; and
    a memory associated with the microcontroller and configured to store a control program, said command signals, and said and feedback signals, said memory also being configured to store operating characteristics of at least one of said hydraulic control valve and said hydraulic actuator,
    said microcontroller being configured to use the stored operating characteristics locally in said control program to generate control signals that perform closed-loop control of the hydraulic actuator.

2. The apparatus according to claim 1, wherein said microcontroller is configured to operate a control program that uses the stored operating characteristics and feedback signals to (i) compensate for a non-linear characteristic of the hydraulic actuator, and (ii) generate compensated control signals that provide substantially linear operational control of the hydraulic control valve.

3. The apparatus according to claim 1, further comprising a plurality of pressure sensors coupled to the hydraulic control valve and configured to (i) monitor pressure going into and coming out of the hydraulic control valve, and (ii) generate a pressure feedback signal that is provided to the microcontroller.

4. The apparatus according to claim 3, wherein said stored characteristics correspond to hydraulic fluid flow vs. hydraulic valve stroke at a predetermined pressure drop, and wherein said microcontroller is configured to execute a control program, stored in the memory, that references said pressure feedback signals and said stored characteristics to calculate a compensated flow rate using flow rate linearization, said microcontroller providing the compensated flow rate to the hydraulic control valve as a control signal configured to perform control of the hydraulic actuator.

5. The apparatus according to any one of claims 1 and 2, wherein said stored characteristics correspond to at least one of:
    static and dynamic friction of a machine control axis;
    a natural frequency of a machine control axis at different positions of the hydraulic actuator; and
    operational parameters determined by the local microcontroller.

6. The apparatus according to any one of claims 3 and 4, wherein said hydraulic control valve comprises first and second proportional valves configured to control the flow of hydraulic fluid through a pair of hydraulic lines coupled to the hydraulic actuator, and wherein said microcontroller uses feedback signals from the pressure sensor to control said first and second proportional valves to provide regenerative and non-regenerative control of said hydraulic actuator, whereby the pressure or flow of the hydraulic fluid into and out of the hydraulic actuator can be profiled.

7. The apparatus according to claim 6, wherein said microcontroller is configured to control said first and second proportional valves to independently adjust an orifice which meters hydraulic fluid into and out of each side of the hydraulic actuator.

8. The apparatus according to claim 6, wherein said microcontroller is configured to dynamically control the opening of said first and second proportional valves based on the required flow to the hydraulic actuator and the supply and load pressures.

9. The apparatus according to claim 1, wherein said microcontroller is coupled to at least one of:
    a hydraulic manifold configured to supply hydraulic fluid to said hydraulic actuator;
    said hydraulic actuator; and
    said hydraulic control valve.

10. An injection molding machine including the apparatus of claim 1.

11. A method of controlling a hydraulic actuator in an injection molding machine having (i) a system control processor, and (ii) a hydraulic control valve that regulates a supply of hydraulic fluid to a hydraulic actuator, comprising the steps of:
    storing in a microcontroller, which is disposed remotely from the system control processor, a control program for controlling a movement of the hydraulic actuator;
    storing in the microcontroller characteristic information corresponding to at least one of (i) the hydraulic control valve, and (ii) the hydraulic actuator;

providing to the microcontroller, and storing in a memory coupled to the microcontroller, feedback signals from at least one sensor which senses a performance characteristic associated with the hydraulic actuator;

providing to the microcontroller, and storing in said memory, command signals from the system control processor;

said microprocessor using (i) said stored control program, (ii) said stored characteristic information, (iii) said stored command signals, and (iv) said stored feedback signals, to calculate control signals to control the hydraulic control valve; and said microcontroller transmitting said control signals to the hydraulic control valve to cause movement of the hydraulic actuator.

12. The method according to claim 11, further comprising the step of:

said microcontroller transmitting said stored feedback signals from said microcontroller to the system control processor.

13. The method according to claim 11, wherein said hydraulic control valve comprises first and second proportional valves configured to control the flow of hydraulic fluid through a pair of hydraulic lines coupled to the hydraulic actuator, and further comprising the steps of:

said microcontroller calculating control signals for the first and said second proportional valves; and said microcontroller transmitting said control signals to the first and said second proportional valves.

14. The method according to claim 13, wherein said microcontroller controls said first and second hydraulic control valves to provide regenerative and non-regenerative control of said hydraulic actuator.

15. The method according to claim 11, further comprising the steps of:

said microcontroller calculating control signals for a plurality of hydraulic actuator valves; and said microcontroller transmitting said control signals to said plurality of hydraulic actuator valves.

16. The method according to any one of claims 11, 13, 14, and 15, wherein said microcontroller controls said hydraulic control valve to linearize non-linear characteristics of said hydraulic actuator.

* * * * *